(12) United States Patent
Ward et al.

(10) Patent No.: US 8,693,016 B2
(45) Date of Patent: Apr. 8, 2014

(54) PROCESSING MULTI-PAGE SEGMENTS IN A PARALLEL RIP ENVIRONMENT WITH A SERIAL RIP

(75) Inventors: David Ward, Broomfield, CO (US); Rivadeneira Randell, Broomfield, CO (US); Arthur R. Roberts, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 13/186,610

(22) Filed: Jul. 20, 2011

(65) Prior Publication Data

US 2013/0021623 A1 Jan. 24, 2013

(51) Int. Cl.
*G06K 15/02* (2006.01)
(52) U.S. Cl.
USPC ............................ 358/1.13; 358/1.15; 358/1.9
(58) Field of Classification Search
USPC ................................................. 358/1.15, 1.9
See application file for complete search history.

(56) References Cited

U.S. PATENT DOCUMENTS

| | | | |
|---|---|---|---|
| 6,879,409 B2 | 4/2005 | Motamed et al. | |
| 7,161,705 B2 | 1/2007 | Klassen | |
| 2002/0060801 A1 | 5/2002 | Motamed et al. | |
| 2004/0196496 A1 | 10/2004 | Klassen | |
| 2004/0196498 A1* | 10/2004 | Klassen | 358/1.15 |
| 2004/0243934 A1 | 12/2004 | Wood | |
| 2007/0057978 A1* | 3/2007 | Hagiwara | 347/5 |
| 2009/0080025 A1 | 3/2009 | Aronshtam et al. | |
| 2010/0103444 A1 | 4/2010 | Farrell et al. | |
| 2012/0023369 A1 | 1/2012 | Bourbonnais | |

* cited by examiner

*Primary Examiner* — King Poon
*Assistant Examiner* — Andrew H Lam
(74) *Attorney, Agent, or Firm* — Duft Bornsen & Fettig LLP

(57) ABSTRACT

Systems and methods are provided for error correction in a parallel RIP environment. The system comprises parallel RIPs and a serial RIP. The system receives a print job comprising logical pages, separates the print job into segments of logical pages, and distributes the segments to the parallel RIPs for interpretation and rasterization. The system further determines that a parallel RIP has encountered an error indicating that a segment includes multiple logical pages, and instructs the serial RIP to rasterize the segment responsive to detecting the error.

20 Claims, 4 Drawing Sheets

PROCESSING MULTI-PAGE SEGMENTS IN A PARALLEL RIP ENVIRONMENT WITH A SERIAL RIP

FIELD OF THE INVENTION

The invention relates to the field of printing, and in particular, to print controllers capable of error correction while rasterizing incoming print jobs.

BACKGROUND

In the field of printing, it is generally desirable to maximize printing quality and printing speed at a printer. Customers tend to dislike any delay that occurs between sending a print job to a printer and receiving the printed sheets of the print job. Therefore, printer manufacturers strive to optimize both the physical printing speed of marking engines that mark printed sheets and the processing speed of devices that prepare incoming print jobs for printing by interpreting and rasterizing them.

In order to increase the processing speed for incoming print data, print controllers often include multiple Raster Image Processors (RIPs) that operate in parallel. The print controller splits the incoming print job into segments of data (e.g., logical pages), and sends the segments to the parallel RIPs for interpretation and rasterization. For example, each of the parallel RIPs may interpret incoming segments by generating a display list or other instructions for marking pels on a page. The parallel RIPs may further rasterize/render the segment by placing pels in a bitmap image with an appropriate mark/color based upon the generated display list.

Processing incoming print data using parallel RIPs is generally desirable because it increases the speed at which a print job may be interpreted and rasterized, which is often the most time consuming part of printing an incoming job. Unfortunately, segmenting a print job encoded according to a page description language (e.g., PostScript) into individual logical pages may result in undesirable performance issues. Reliably segmenting the print job typically requires utilizing a pre-RIP interpretation step, wherein the entire print job is pre-processed and interpreted by a serial processor. The print job is then segmented into logical pages based upon the interpreted print data. Interpretation is generally faster than rasterization/rendering, but still requires significant processing resources. As such, adding serial interpretation as a necessary pre-processing step results in a significant loss of performance because it creates a serial bottleneck for the parallel processing that occurs later on. Thus, serial interpretation and pre-processing is not preferred because it limits the speed at which print data is provided for parallel RIP processing.

An alternative method involves finding comments within the print data that are used to indicate a page boundary (e.g., Document Structuring Convention (DSC) comments), and splitting the print job into segments based upon these comments. This technique is generally much faster than serial pre-processing of the print job because it is not necessary to interpret the print data in order to detect page boundaries. However, this method relies upon the integrity of the application that first generated the print job (an external source over which a print controller has no control). If the application was not properly designed, it might not include a comment to mark each and every page boundary in the print job. Unfortunately, if the print job is improperly segmented, page-level instructions for the print job (e.g., watermarks, footers, etc. defined in a job ticket) will be applied to the wrong segments of print data. Thus, a parallel RIP that encounters a multi-page segment for processing is likely to generate invalid rasterized print data for the job.

In the present state of the art, a print controller detecting such a segmenting error from a parallel RIP will abort the print job in order to prevent the generation of bad print data, and will indicate to the host that the print job contains an error. Thus, only a portion of the print job will be printed (i.e., the pages of the print job that occur after the error will not be printed). This is generally undesirable to the end user, because the end user may not be capable of generating a print job that has a comment indicating each page boundary. Even assuming that the print job can be recreated in such a manner, regenerating the print job creates a significant and undesirable delay in the printing process.

SUMMARY

Embodiments described herein provide a serial RIP used in tandem with parallel RIPs of a print controller to process multi-page segments of a print job. As segments of print data (e.g., logical pages) are distributed to the parallel RIPs, the segments are also sent to the serial RIP for interpretation. Whenever a multi-page segment is encountered by a parallel RIP, an error is generated and the print controller directs the serial RIP to rasterize the segment. The serial RIP encounters no error in rasterizing the multi-page segment, because the serial RIP has interpreted the entire print job before the segment, and keeps track of the page number for each page in the multi-page segment. Thus, any page-level instructions for the print job will be properly applied to the correct pages. Additionally, because interpretation is generally faster than rasterization, the serial RIP may interpret print data at roughly the same speed that the parallel RIPs are interpreting and rasterizing the print data (i.e., the serial RIP keeps up with the parallel RIPs). Thus, the entire print job may be interpreted and rasterized at a speed associated with parallel raster image processing.

One embodiment is a print controller that processes print data for a print job. The print controller comprises at least two parallel Rasterization Image Processors (RIPs), a serial RIP processor, and a control unit. The control unit is operable to receive a print job comprising a plurality of logical pages, to separate the print job into segments of logical pages, and to distribute the segments to the parallel RIPs for interpretation and rasterization. The control unit is further operable to determine that a parallel RIP has encountered an error indicating that a segment includes multiple logical pages, and to instruct the serial RIP to rasterize the segment responsive to detecting the error.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
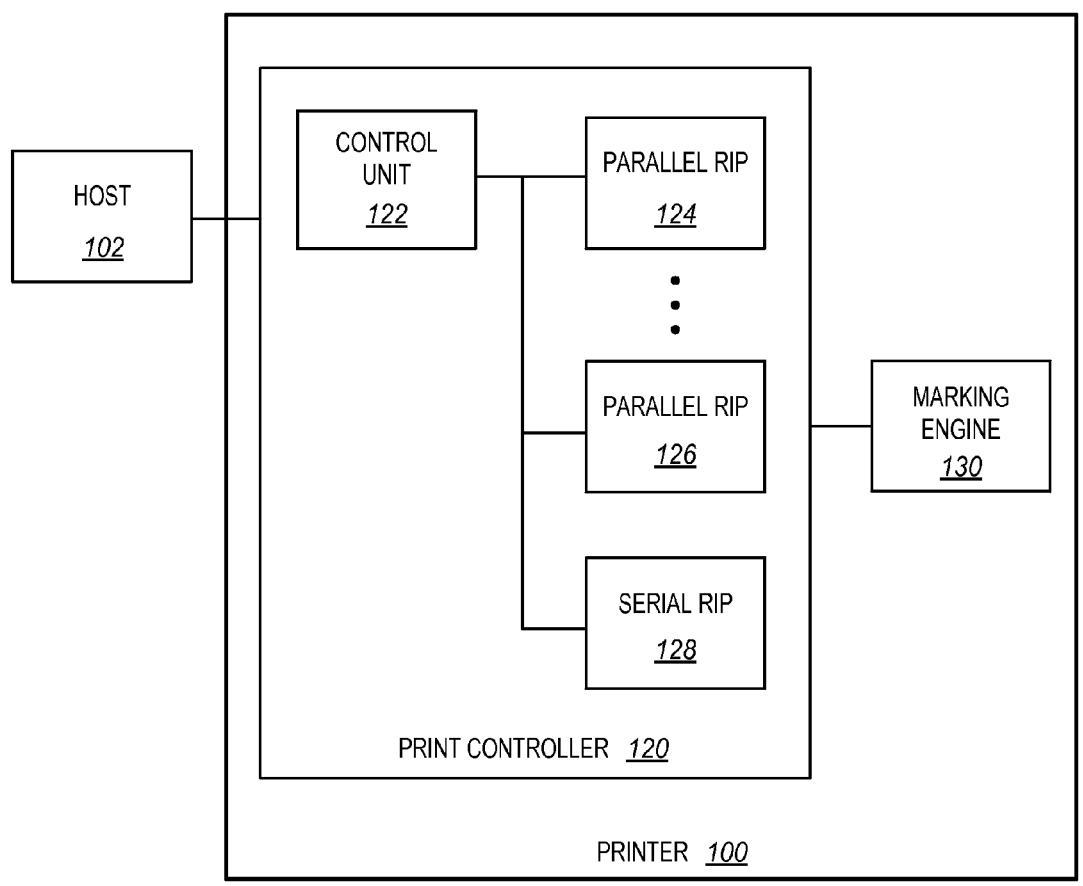
FIG. 1 is a block diagram of a print controller in an exemplary embodiment.

FIG. 1 is a block diagram of a print controller 120 in an exemplary embodiment. In FIG. 1, print controller 120 of printer 100 is coupled with host 102 and marking engine 130. Host 102 may comprise a computer, a print server, a software application, or any other functional component capable of submitting a print job. Marking engine 130 may comprise any combination of printing machinery operable to mark rasterized data onto a physical sheet. Marking engine 130 may use, for example, toner or ink to mark an image onto a sheet.

Print controller 120 comprises any system, device, or component operable to direct the operations of printer 100. Print controller 120 is further capable of processing incoming print data from host 102. Incoming print data may be encoded according to a page description language (e.g., PostScript, Advanced Function Printing (AFP), etc.), and may be accompanied by a job ticket or metadata that provides processing instructions for the print data. In this embodiment, print controller 120 comprises control unit 122, parallel Raster Image Processors (RIPs) 124-126, and serial RIP 128. Control unit 122 comprises any system, component, or device operable to direct parallel RIPs 124-126 in the interpretation and rasterization of print data from a print job. Parallel RIPs 124-126 may comprise any number of RIPs. For example, parallel RIPs 124-126 may comprise two, three, or even more RIPs designed for parallel processing. Furthermore, each parallel RIP 124-126 may have the same processing speed as other RIPs, or may have a faster or slower processing speed than other RIPs of print controller 120. Parallel RIPs 124-126 may be implemented on single-core or multi-core processors. Serial RIP 128 also comprises a raster image processor. Serial RIP 128 may have the same speed or a different speed of processing than parallel RIPs 124-126. Additionally, serial RIP 128 may be implemented on single-core or multi-core processors. In one embodiment, serial RIP 128 and parallel RIPs 124-126 exist as separate processes that reside on the same computer or system (e.g., a blade server). Rasterized data from RIPs 124-128 may be stored at a memory location accessed by marking engine 130, or may be cached for later printing by marking engine 130.

Print controller 120 may further include backend assemblers or other functional components operable to assemble rasterized print data from parallel RIPs 124-126 into an appropriate sequence for use by marking engine 130. Additionally, control unit 122 may generate a queue indicating the order in which assembled rasterized segments should be sent to marking engine 130. Preferably, rasterized data is freed after it has been marked onto physical sheets of printed media by marking engine 130. Print controller 120 may further comprise buffers, shared memory, print spools, and other functional components that assist printer 100 in processing and physically printing an incoming job.

Print controller 120 provides an advantage over existing systems because it transmits segments of print data to serial RIP 128 for interpretation and also distributes the segments to parallel RIPs 124-126 for interpretation and rasterization. Print controller 120 is capable of recovering from segmenting errors in print data, because serial RIP 128 has interpreted the logical pages for the job leading up to the multi-page segment. Therefore, serial RIP 128 is capable of applying page-level instructions to the correct numbered pages of the segment. Thus, print controller 120 implements parallel RIP processing, yet is also capable of recovering from errors that would normally occur when processing segments of print data that include multiple pages.

Further details of the operation of print controller 120 will be discussed with regard to FIG. 2. Assume, for this embodiment, that print controller 120 receives incoming print jobs from host 102 for processing. The print data for the incoming jobs is interpreted and rasterized before it is marked onto a sheetside by marking engine 130.

Figure 2:
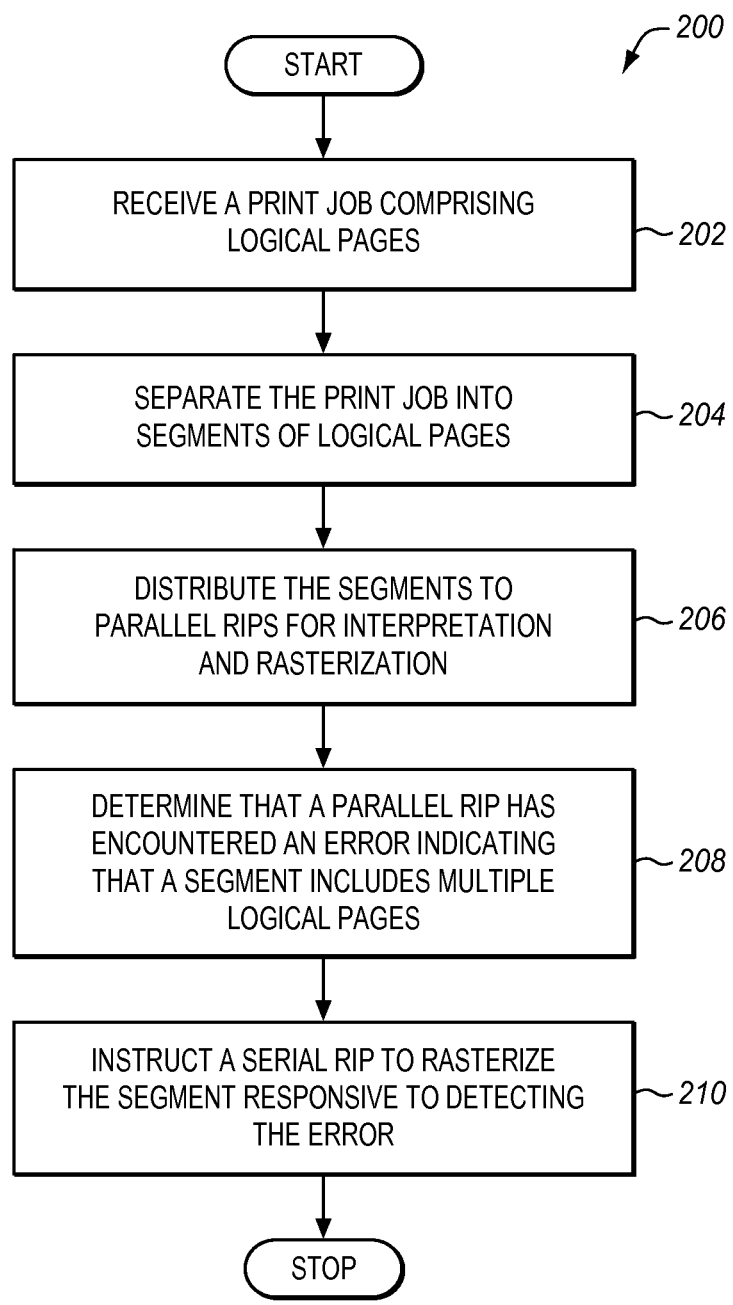
FIG. 2 is a flowchart illustrating a method of error correction for parallel RIP processing in an exemplary embodiment.

FIG. 2 is a flowchart illustrating a method 200 of error correction for parallel RIP processing an exemplary embodiment. The steps of method 200 are described with reference to print controller 120 of FIG. 1, but those skilled in the art will appreciate that method 200 may be performed in other systems or devices. The steps of the flowcharts described herein are not all inclusive and may include other steps not shown. The steps described herein may also be performed in an alternative order.

In step 202, control unit 122 receives a print job comprising a plurality of logical pages. A logical page may comprise instructions encoded according to a page description language, such as PostScript. These instructions allow print controller 120 to generate rasterized image data (i.e., a sheet image) that will be marked onto a printed page by marking engine 130. In certain circumstances (such as N-up printing), print data from multiple logical pages may be combined onto a single sheetside image for printing by marking engine 130.

In step 204, control unit 122 separates the print job into segments of logical pages. Preferably, the segments will each comprise an individual logical page, based upon page boundaries detected in the print data. For example, the print data may be separated into segments based upon comments in Document Structuring Conventions that are used to indicate page boundaries, or the print data may be separated based upon other criteria. Because print jobs are typically generated by third-party sources, they might not always include comments that indicate each and every page break in the job. Thus, segmenting the print job based upon comments in the print data may result in several segments that include multiple pages.

In step 206, control unit 122 distributes the segments to parallel RIPs 124-126 for interpretation and rasterization/rendering. Segments may typically be distributed to parallel RIPs 124-126 in a round-robin order, although more complex techniques may be used for distribution of segments to each parallel RIP. Because each segment may take a longer or shorter amount of time to process depending upon the complexity of the print data for that segment, a parallel RIP may be capable of processing multiple simple segments while another parallel RIP of the same speed works on a single complex segment. Thus, in some embodiments, control unit 122 may maximize processing speed by distributing segments to parallel RIPs 124-126 as each parallel RIP becomes available. Control unit 122 may further be operable to track the progress of each segment so that rasterized print data may be assembled and sent to marking engine 130 in the appropriate order for processing.

During the processing of print data, parallel RIPs 124-126 may report their status to control unit 122 in order to help control unit 122 track the overall progress of the print job. For example, parallel RIPs 124-126 may be operable to report successful interpretation of a segment, and may be further operable to report errors encountered during interpretation of the segment.

In addition to distributing segments to parallel RIPs 124-126, control unit 122 also transmits the segments to serial RIP 128 for interpretation. This transmission may be in parallel with, before, or after distribution of segments to parallel RIPs 124-126. The data segments may be transmitted all at once to serial RIP 128, or may be transmitted in a series of requests. In one embodiment, serial RIP 128 interprets, but does not rasterize each segment of the print job. Instead, serial RIP 128 only rasterizes segments having multiple logical pages. Interpretation is distinguished from rasterization in that interpretation occurs when a RIP reads the print data and creates a display list or other series of commands for defining an output image. In contrast, rasterization (also known as rendering or screening) is the task of taking an image described in, for example, a vector graphics format (e.g., a display list) and generating a raster image (e.g., pixels or dots placed at specific locations) for output on a printer. The rasterized image (i.e., the image of the actual marks to be placed on a page) is used by a marking engine to mark an image onto printed sheets for the print job. Interpretation is generally a much faster process than rasterization. For example, depending on the complexity of the print data in a segment, interpretation may be about three times as fast as rasterizing. Because of this, serial RIP 128 can keep up with multiple parallel RIPs 124-126 as they perform interpretation and rasterization for each segment.

In one embodiment, serial RIP 128 interprets each received segment after it has completed interpreting prior segments. In such an embodiment, control unit 122 may limit the speed at which segments are transmitted to serial RIP 128, such that a segment is not transmitted to serial RIP 128 for interpretation until one of parallel RIPs 124-126 reports successful interpretation or rasterization of that segment. In a further embodiment, serial RIP 128 awaits a command or request from control unit 122 that directs serial RIP 128 to begin interpretation of the next segment. Instructing serial RIP 128 to interpret print data substantially concurrently with parallel RIPs 124-126 may save processing time, as serial RIP 128 will not backtrack to earlier print data when an error is encountered.

While in operation, control unit 122 directs parallel RIPs 124-126 as they process incoming segments of print data. This process may continue in a much similar fashion to well-known parallel RIP techniques. However, when an error is generated because a parallel RIP encounters a segment that comprises multiple logical pages, control unit 122 is operable to account for the error using the following technique, while still maintaining the speed of parallel RIP processing.

In step 208, control unit 122 determines that a parallel RIP has encountered an error indicating that a segment includes multiple pages. Typically, this error will be detected during interpretation of the segment. The error may be reported by one of parallel RIPs 124-126, or control unit 122 may query parallel RIPs 124-126 to make the determination. An error need not be a condition that prevents a parallel RIP from functioning. Rather, an error may be a detection made by a parallel RIP that suggests that print data will not be properly processed by the system. For example, a parallel RIP may detect a parameter in the segment indicating the start of a new page. The parallel RIP may then determine that it has reached a multi-page segment, and then report this condition as an error. This does not mean that the parallel RIP cannot process the print data, but rather indicates that the print data has been improperly segmented. This in turn could mean that special processing instructions in a job ticket are associated with the wrong segments of print data.

In step 210, control unit 122 instructs serial RIP 128 to rasterize/render the segment that includes multiple logical pages, responsive to detecting the error. Serial RIP 128 encounters no error in the interpretation of the multi-page segment, because serial RIP 128 has already interpreted the logical pages that have come before the segment. Therefore, serial RIP 128 is aware of the page number of each page in the segment that it rasterizes. Because of this, special page-level processing instructions in, for example, a job ticket, are always applied to the proper pages of the print job by serial RIP 128. Furthermore, when serial RIP 128 has been interpreting print data at about the same time as parallel RIPs 124-126, serial RIP 128 may rasterize the segment having the error without significantly disrupting the speed of parallel processing.

In one embodiment, it may be desirable for control unit 122 to continue transmission of other segments to other parallel RIPs (e.g., parallel RIPs that did not encounter an error) while serial RIP 128 rasterizes the segment having the multiple pages. This reduces any potential impact on processing speed for the print job by continuing parallel processing even after a segmenting error has been detected in the print data. This embodiment is most desirable when the segments sent to parallel RIPs 124-126 are not associated with page-level instructions. In a further embodiment, it may be desirable to halt transmission of segments to the parallel RIP that encountered the error, at least until the segment with the error has been flushed from the parallel RIP and/or after serial RIP 128 has been instructed to rasterize the offending segment.

During processing of the print data, print controller 120 may further transmit the rasterized segments to marking engine 130 for printing. Before transmission to marking engine 130, it may be desirable to assemble the rasterized segments into a logical order, so that the print data is not printed out of sequence. For example, a queue may be used to indicate the appropriate order in which segments should be sent to marking engine 130. If the print job includes instructions for N-up printing, it may be desirable to assemble the logical pages into the appropriate N-up configuration for the print job before sending the rasterized print data to marking engine 130 for printing.

Using method 200 described above, print controller 120 may beneficially engage in parallel RIP processing without being vulnerable to errors associated with multi-page segments in print data. Thus, method 200 allows for speedy, reliable processing of print data in a print controller that accounts for segmenting errors in print data.

EXAMPLES

In the following examples, additional processes, systems, and methods are described in the context of a serial RIP 128 operating at a print controller 120 to automatically recover the system from segmenting errors in print data.

Figure 3:
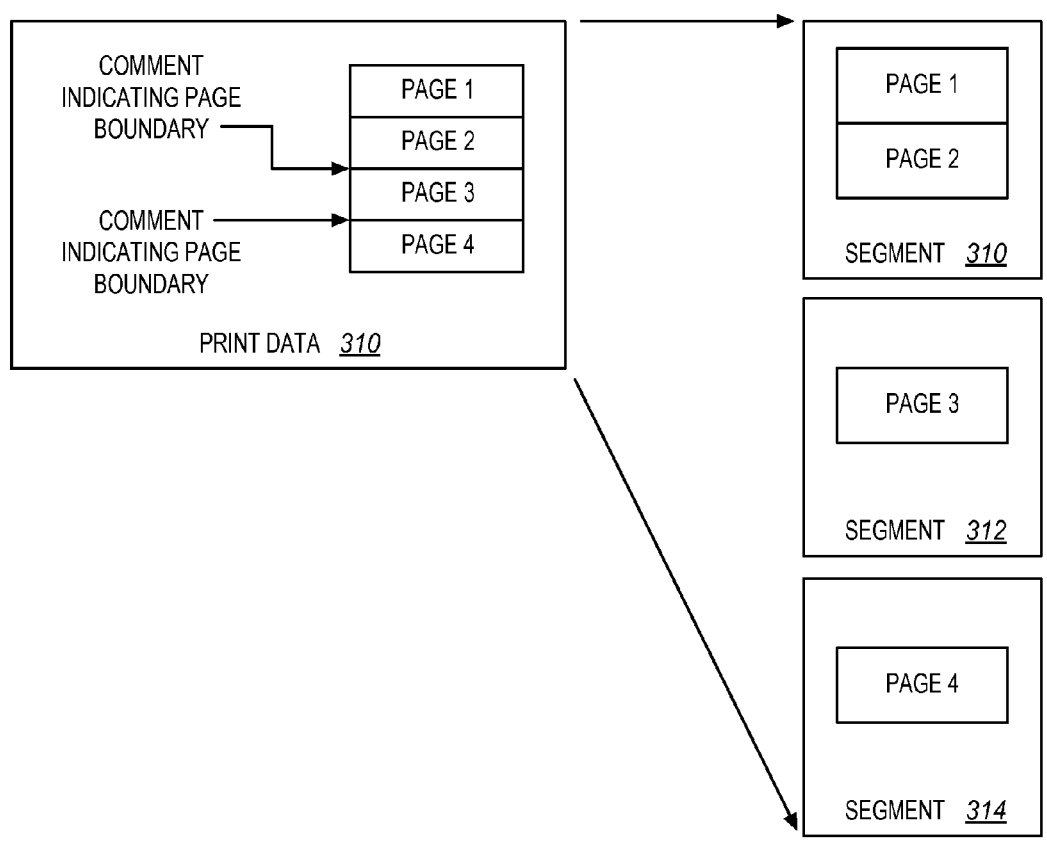
FIG. 3 is a block diagram illustrating the segmentation of logical pages of a print job in an exemplary embodiment.

FIG. 3 is a block diagram illustrating the segmentation of logical pages of a print job in an exemplary embodiment. Assume, for this example, that print controller 120 of FIG. 1 receives print data 302, comprising four logical pages. In this example, the boundary between the second page and the third page is indicated by a PostScript DSC comment within the print data, as is the boundary between the third and fourth page. No other page boundaries are indicated by the comments within the print data.

A control unit of the print controller segments the print data based upon the detected DSC comments, generating three segments of print data. The first segment 310 includes pages one and two, the second segment 312 includes page three, and the third segment 314 includes page four. The control unit then distributes segment 310 to a first parallel RIP, and segment 312 to a second parallel RIP. The control unit also transmits all three segments to a serial RIP for interpretation.

The parallel RIPs initiate processing of the segments, and the first parallel RIP determines that two logical pages exist within segment 310. The first parallel RIP therefore reports an error to the control unit. The control unit detects the error, and instructs the parallel RIPs to halt the processing of segment 310 and all segments that occur after segment 310 (in this case, all segments). The control unit further instructs the serial RIP to rasterize segment 310. The serial RIP rasterizes the first two logical pages, and reports to the control unit that it has completed processing segment 310. The control unit determines that segment 310 included two pages based upon information from the serial RIP, and resumes transmission of segments to the parallel RIPs for processing, beneficially continuing processing of the print job at speeds associated with parallel processing.

In a further example, a control unit receives a print job that includes logical pages of print data, and a watermark defined in a job ticket and associated with a logical page (or set of logical pages) identified by a number, tag, label, etc. The control unit segments the print data based upon comments in the print data. The control unit assumes that each segment corresponds to a single logical page, and therefore associates each segment with a page number. Unfortunately, one of the segments has been improperly segmented and includes multiple logical pages. Because of this, the page numbers associated with the segments are inaccurate. This in turn means that the watermark in the job ticket will be applied to the wrong segment of print data.

After parallel RIPs of the print controller receive the segmented print data, one of the parallel RIPs initiates processing of the segment that includes multiple logical pages. The parallel RIP detects that the segment includes multiple pages, and reports this to the control unit. Responsive to detecting the error, the control unit directs the serial RIP to rasterize the multi-page segment. Because the serial RIP tracks the actual page boundaries in the print data based upon previously interpreted print data (instead of comments that accompany the print data), the serial RIP is capable of applying the watermark to the appropriate logical page, regardless of whether a segmenting error has occurred. The serial RIP proceeds to report back the number of pages in the multi-page segment to the control unit.

Based upon the information received from the serial RIP, the control unit associates the remaining segments with the appropriate page numbers from the print job. With the remaining segments properly numbered, the subsequent print data may be properly processed by the parallel RIPs.

In a further embodiment, it may be desirable to send each and every remaining segment of the print job to the serial RIP for rasterization once the error has been detected. This may further ensure that appropriate instructions from, e.g., a job ticket, are applied to appropriate segments for the remainder of the print job.

In a further embodiment, it may be desirable to pause processing of segments at the parallel RIPs until the serial RIP has completed processing of the multi-page data segment and has reported the number of pages in the segment. Once the number of pages in the multi-page segment is known, the control unit can accurately re-number the segments of print data. It may therefore be preferable to pause only those segments that occur after the multi-page segment, as only these segments are likely to be associated with job ticket instructions for the wrong page. In some embodiments, it may be desirable to flush segments from parallel the RIPs that are associated with inappropriate instructions, and then to re-transmit the segments (and their newly associated instructions) to the parallel RIPs.

In a further embodiment, the serial RIP may engage in a pre-RIP (e.g., an interpretation) process for the multi-page segment when instructed to rasterize the segment. This allows the serial RIP to quickly determine the total number of pages in the segment and report this number of pages to the control unit before engaging in rasterization of the segment. This provides a benefit because it reduces the down time during which parallel the RIPs are paused.

In a further embodiment, the control unit maintains a queue for providing rasterized sheet images to a marking engine. Once a page has been successfully rasterized, the entry in the queue corresponding to the logical page may be marked as "valid" or may otherwise indicate that the rasterized page is ready for transmission to marking engine 130. Alternatively, an entry may be marked as "invalid" if it comprises multiple logical pages. When an invalid entry reaches the front of a sheet queue, a serial RIP rasterizes the logical pages associated with the invalid entry.

Figure 4:
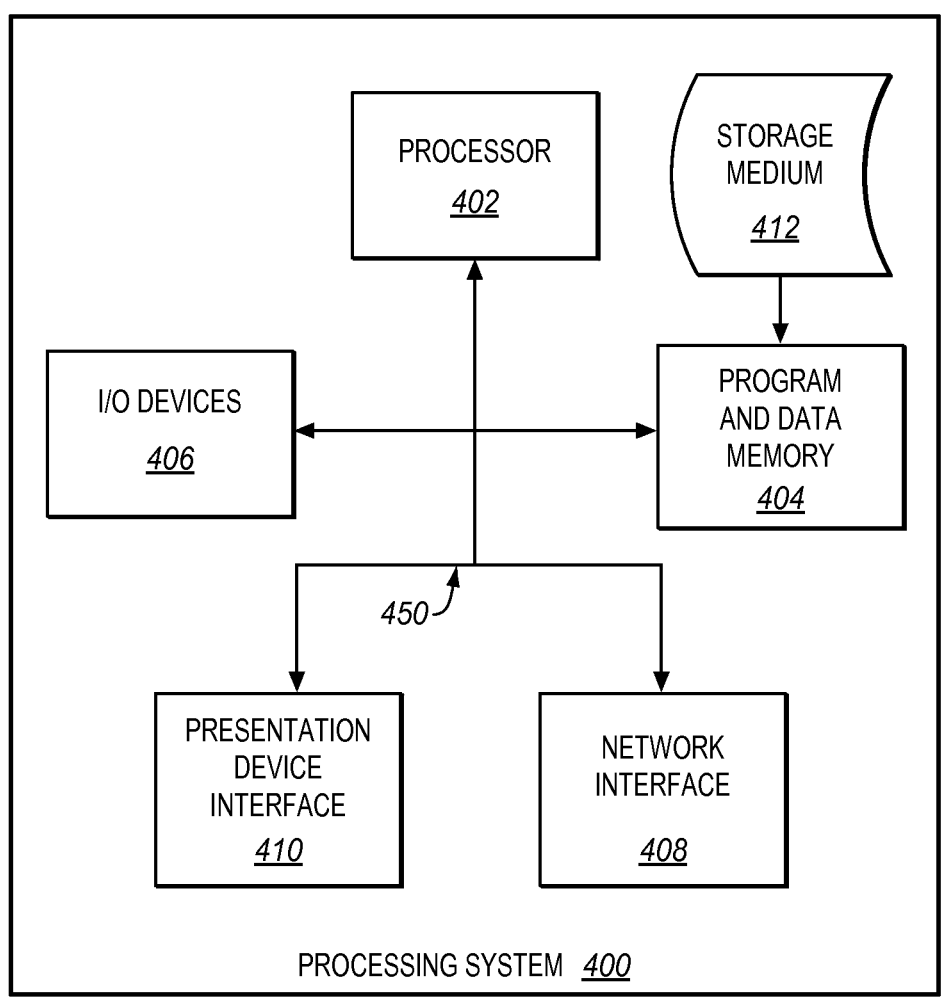
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print controller 120 to perform the various operations disclosed herein. FIG. 4 illustrates a processing system operable to execute a computer readable medium embodying programmed instructions to perform desired functions in an exemplary embodiment. Processing system 400 is operable to perform the above operations by executing programmed instructions tangibly embodied on a computer readable storage medium 412. In this regard, embodiments of the invention can take the form of a computer program accessible via the computer-readable medium 412 providing program code for use by a computer or any other instruction execution system. For the purposes of this description, a computer readable storage medium 412 can be anything that can contain or store the program for use by the computer.

The computer readable storage medium 412 can be an electronic, magnetic, optical, electromagnetic, infrared, or semiconductor device. Examples of the computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 400, being suitable for storing and/or executing the program code, includes at least one processor 402 coupled to memory elements 404 through a system bus 450. The memory elements 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc) can be coupled to the system either directly or through intervening I/O controllers. Network adapter interfaces 408 may also be coupled to the system to enable the processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation devices, such as printing systems and displays for presentation of presentation data generated by processor 402.

Although specific embodiments were described herein, the scope of the invention is not limited to those specific embodiments. The scope of the invention is defined by the following claims and any equivalents thereof.

We claim:

1. A print controller, comprising:
   at least two parallel Rasterization Image Processors (RIPs);
   a serial RIP; and
   a control unit operable to receive a print job comprising a plurality of logical pages, to separate the print job into segments of logical pages, to distribute the segments to the parallel RIPs for interpretation and rasterization, to determine that a parallel RIP has encountered an error indicating that a segment includes multiple logical pages, and to instruct the serial RIP to rasterize the segment that includes multiple logical pages responsive to detecting the error while parallel RIPs continue processing other segments of the print job.

2. The print controller of claim 1, wherein:
   the error comprises a detection by the parallel RIP of an instruction in the segment that indicates the beginning of a new logical page.

3. The print controller of claim 1, wherein:
   the control unit is further operable to transmit the segments to the serial RIP for interpretation, and to instruct the serial RIP to interpret segments concurrently with the parallel RIPs.

4. The print controller of claim 1, wherein:
   the control unit is further operable to refrain from instructing the serial RIP to rasterize segments that do not include multiple logical pages.

5. The print controller of claim 1, wherein:
   the control unit is further operable to halt transmission of subsequent segments to the parallel RIP that encountered the error, to flush the segment from the parallel RIP, and to resume distribution of segments to the parallel RIP responsive to flushing the segment.

6. The print controller of claim 1, wherein:
   the logical pages are encoded according to PostScript, and the control unit is further operable to separate the logical pages into segments based upon Document Structuring Convention (DSC) comments.

7. The print controller of claim 1, wherein:
   the control unit is further operable to store entries in a sheet queue wherein each entry corresponds to a segment, to mark an entry in the sheet queue as invalid responsive to determining that the parallel RIP has encountered an error in attempting to process a corresponding segment, and to instruct the serial RIP to rasterize the segment responsive to marking the entry as invalid.

8. The print controller of claim 1, wherein:
   the segments are associated with numbered logical pages, the print job further comprises page-level instructions for processing a group of the numbered logical pages, the error results from the segment being associated with an inaccurate page number, and
   the serial RIP is operable to determine the page number of each logical page in the segment and to apply the page-level instructions to the group of numbered logical pages.

9. A method for a print controller that processes data for a print job, the method comprising:
   receiving a print job comprising a plurality of logical pages;
   separating the print job into segments of logical pages;
   distributing the segments to at least two parallel Rasterization Image Processors (RIPs) for interpretation and rasterization;
   determining that a parallel RIP has encountered an error indicating that a segment includes multiple logical pages; and
   instructing a serial RIP to rasterize the segment that includes multiple logical pages responsive to detecting the error while parallel RIPs continue processing other segments of the print job.

10. The method of claim 9, wherein:
    the error comprises a detection by the parallel RIP of an instruction in the segment that indicates the beginning of a new logical page.

11. The method of claim 9, further comprising:
    transmitting the segments to the serial RIP for interpretation; and
    instructing the serial RIP to interpret segments concurrently with the parallel RIPs.

12. The method of claim 9, further comprising:
    refraining from instructing the serial RIP to rasterize segments that do not include multiple logical pages.

13. The method of claim 9, further comprising:
    halting transmission of subsequent segments to the parallel RIP that encountered the error;
    flushing the segment from the parallel RIP; and
    resuming distribution of segments to the parallel RIP responsive to flushing the segment.

14. The method of claim 9, wherein:
    the logical pages are encoded according to PostScript, and wherein the method further comprises:
    separating the logical pages into segments based upon Document Structuring Convention (DSC) comments.

15. The method of claim 9, further comprising:
    storing entries in a sheet queue wherein each entry corresponds to a segment;
    marking an entry in the sheet queue as invalid responsive determining that the parallel RIP has encountered an error in attempting to process a corresponding segment; and
    instructing the serial RIP to rasterize the segment upon responsive to marking the entry as invalid.

16. The method of claim 9, wherein:
    the segments are associated with numbered logical pages, the print job further comprises page-level instructions for processing a group of the numbered logical pages, and the error results from the segment being associated with an inaccurate page number, wherein the method further comprises:
    determining, with the serial RIP, the page number of each logical page in the segment; and
    applying, with the serial RIP, the page-level instructions to the group of numbered logical pages.

17. A non-transitory computer readable medium embodying programmed instructions which, when executed by a processor, are operable for performing a method comprising:

receiving a print job comprising a plurality of logical pages;

separating the print job into segments of logical pages;

distributing the segments to at least two parallel Rasterization Image Processors (RIPs) for interpretation and rasterization;

determining that a parallel RIP has encountered an error indicating that a segment includes multiple logical pages; and instructing a serial RIP to rasterize the segment that includes multiple logical pages responsive to detecting the error while parallel RIPs continue processing other segments of the print job.

18. The medium of claim 17, wherein:

the error comprises a detection by the parallel RIP of an instruction in the segment that indicates the beginning of a new logical page.

19. The medium of claim 17, wherein the method further comprises:

transmitting the segments to the serial RIP for interpretation; and instructing the serial RIP to interpret segments concurrently with the parallel RIPs.

20. The medium of claim 17, wherein the method further comprises:

refraining from instructing the serial RIP to rasterize segments that do not include multiple logical pages.

* * * * *